April 27, 1948.      E. S. GODDARD      2,440,469
MULTIPLE CLIP AND BRACKET
Filed Oct. 23, 1944
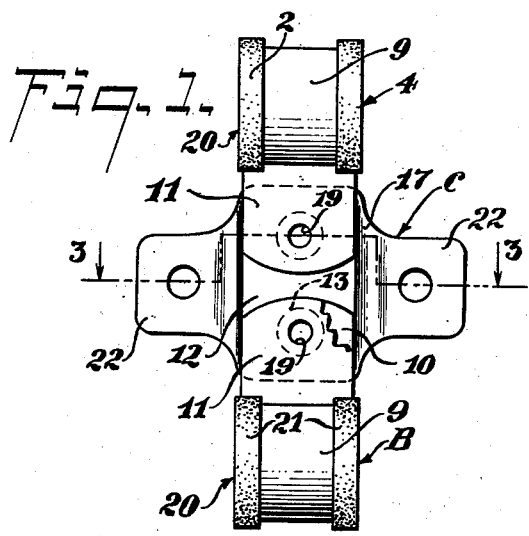
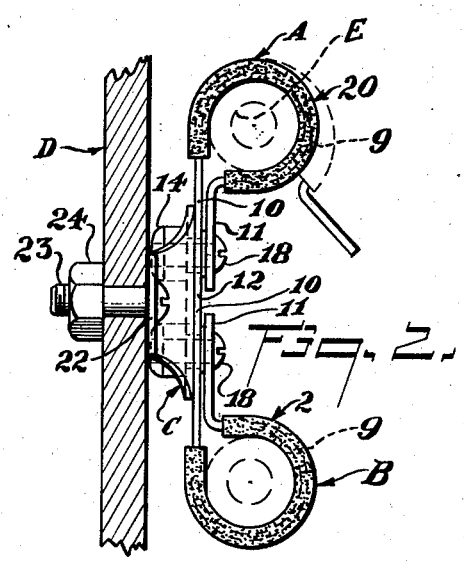
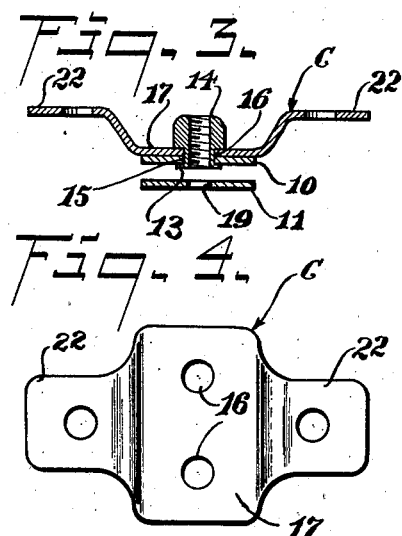
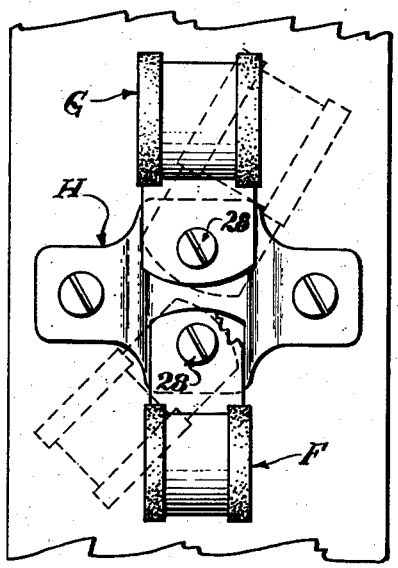
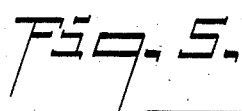
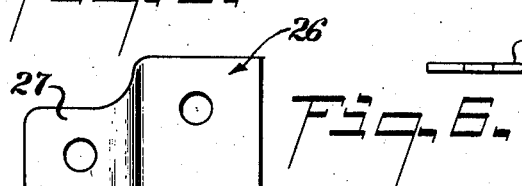
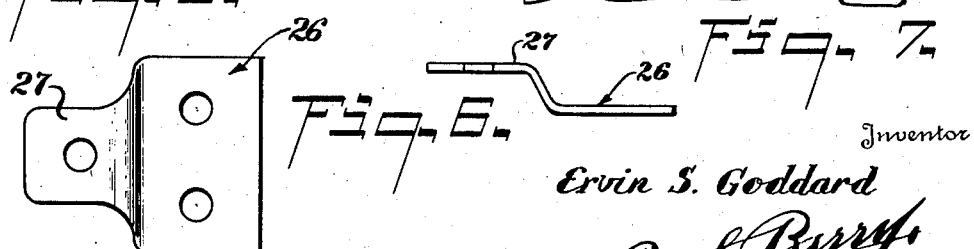
Inventor
Ervin S. Goddard
By R. S. Barry
Attorney Patented Apr. 27, 1948

2,440,469

UNITED STATES PATENT OFFICE 2,440,469

MULTIPLE CLIP AND BRACKET

Ervin S. Goddard, Huntington, W. Va., assignor to Adel Precision Products Corp., a corporation of California Application October 23, 1944, Serial No. 559,984

6 Claims. (Cl. 248—68)

1

This invention relates to clips for supporting conduit lines, wires and the like in aircraft, surface ships and other structures where it is desired to anchor such lines at spaced intervals to the structural parts past or adjacent which such lines are extended.

More particularly the present invention pertains to and has for an object the provision of a multiple conduit clip and a mounting means which are constructed, arranged and combined so that a single mounting bracket affords a quick and easy installation of a plurality of integrally joined clips or a plurality of separate clips, in either case, with a saving in time, material and installation costs, as well as a reduction of weight and the amount of space required, compared to clips which are separately installed with individual mounting means.

Another object of this invention is to provide a multiple clip and bracket unit of the character described which affords the advantages as follows:

1. The installation of the unit on a structural part of an aircraft or the like with the clips remaining open and subject to reception of the conduits and being clamped therearound following such installation, also subject to being opened to remove and replace the conduits, without removing the unit from such structural part, it being easier in some instances to effect an installation of the unit on the structural part, with the conduits removed from the unit, especially in crowded and confined places.

2. The mounting of clips of different sizes on the single bracket to accommodate a plurality of conduits of different diameters in unit support of small compass.

3. The provision of a bracket which affords the attachment thereto of a plurality of separate clips or a plurality of clips which are integral with one another, by means of fastenings that also serve as nuts for bolts applied to clamp the clips around the conduits, thereby eliminating parts and manufacturing operations.

4. The provision for swinging the clip elements into different positions by reason of the fastenings employed to secure the clips to the bracket acting as pivots in the form of the invention embodying separate clips, also the provision for swinging the entire unit into different positions where a single fastening is used to secure the bracket to a support, thereby making for a quick installation where the conduits are to be extended at various angles and relative positions.

5. The provision for independently mounting

2 and removing the conduits before or after the bracket is attached to its support.

6. The provision for independently clamping the clips around the conduits without fastening them to the supporting structure on which the bracket is installed, whereby the clips may be clamped around the conduits in a sub-assembly operation before the bracket is installed on the support therefor or may be clamped and unclamped without removing the bracket after the latter is installed.

With the foregoing objects in view, together with such other objects and advantages as may subsequently appear, the invention resides in the parts and in the combination, construction and arrangement of parts hereinafter described and claimed, and illustrated by way of example in the accompanying drawings in which:

Fig. 1 is a front elevation of a multiple clip unit embodying my invention;

Fig. 2 is a side elevation of the clip as installed;

Fig. 3 is a cross sectional view taken on the line 3—3 of Fig. 1;

Fig. 4 is an elevational view of the bracket;

Fig. 5 is a front elevation of a modified form of the bracket;

Fig. 6 is an elevational view of a modified form of bracket;

Fig. 7 is a front elevation of a modified form of the installed clip.

Referring in particular to Figs. 1 to 4 inclusive, it is seen that one embodiment of my invention generally comprises two conduit embracing clips A and B mounted on a single bracket C, shown made of a form-retaining piece of sheet material; which is adapted to be secured as shown in Fig. 4 to a support D such as a structural part of an aircraft or similar structure, not shown.

As here provided the two clips are made from a single resilient metal strap bent to form opposed conduit-embracing loops 9 each of which has opposed apertured ear-like end portions 10 and 11 normally spaced apart and in substantial parallelism. The inner end portions 10 are formed integral with one another by means of a web portion 12 which is the mid portion of the strap. The outer end portions 11, which are the ends of the strap proper are in opposed relation to one another and spaced apart so that they may be sprung outwardly as shown in dotted lines in Fig. 2 to open the loops for reception or removal of the conduits E.

The clips A and B are secured to the bracket C by means of two tubular or hollow rivets 13 which are integral extensions of nuts 14 constituting in effect rivet heads at certain ends of the rivets 13, the rivets being passed through the openings 15 in the inner end portions 10 as well as openings 16 in body portion 17 of the bracket C. This leaves the ends 11 of the loop free to be manipulated to open and close the clips independently of one another.

Bolts 18 are passed through the openings 19 in the ends 11 then through the bores of the hollow rivets 13 so as to be turned in the nuts 14 and when tightened will constrict the loops and clamp them around the conduits as shown in Fig. 2, the ends 10 and 11 being then brought close together being separated only by the heads of rivets 13.

In this connection it should be noted that each loop 9 is provided with a conduit-embracing cushion strip 20 having rebent flanges 21 arranged to embrace the edges and outer faces of the loops so as to hold the strips on the loops. These cushion strips are made of resilient rubber or any other suitable cushioning material which will dampen vibrations and prevent wear and damage of the conduits.

As here shown the bracket C is made of a single piece of stiff sheet or strap metal having its body portion 17 substantially flat and straight and of rectangular form so as to lie flat against the end portions 10 and web portions 12, with its side edges projecting slightly beyond the corresponding edges of the portions 10 and 12 and its openings 16 aligned with the openings 15 in the end portions 10. Attaching ears 22 are formed integral with the body portion 17 and extend from opposite side edges thereof in inwardly offset relation thereto. These ears therefore extend laterally outward from the end portions 10 and web portions 12 so that they may be readily and easily secured to the support B by means of bolts 23 and nuts 24 as shown in Fig. 2, with the body portion 17 spaced outwardly from said support so as to provide adequate space for the nuts 14 and ends of the bolts 18. Thus the bracket as a whole extends transversely of the web portion 11 and end portions 10, with the concave side thereof, which is formed by the offset ears 22, opposed to the support D to accommodate the nuts 14 and ends of bolts 18. This arrangement disposes the clips A and B in outwardly spaced relation to the support D so that they may be readily independently clamped and unclamped for insertion and removal of the conduits E.

It is seen that the multiple clip and single bracket arrangement hereof makes for a simple, compact support of light weight, subject to installation on or reception of the conduits before or after the bracket is installed on the supporting structure D, to best meet the particular installation requirements. The clips may be clamped or opened without effecting the mounting thereof on the bracket or requiring removal of the bracket from the support therefor. If it is desired to swing the unit into different position, the bracket may be installed with a single bolt 23 which then serves as a pivot. This swinging of the entire unit can also be accomplished by the use of the bracket 26 shown in Figs. 6 and 7, which bracket is of the same construction as bracket C except that it has but one attaching ear 27 and can therefore be swung freely about the axis of the single fastening inserted through said one ear. A balanced structure results from positioning the two paired clips on opposite side portions of the bracket, with their mouths directed toward each other.

Instead of the clips being formed of a single piece of strap metal I may, as shown in Fig. 7, employ separate clips F and G which are mounted on a bracket H identical with the bracket C. The fastening elements 28 employed for securing these separate clips are identical with the corresponding means shown in Figs. 1 to 4 inclusive. The separate clips are subject to being swung into different positions relative to one another and to the bracket H, which is an advantage, in that it permits of readily disposing either or both clips at various positions to best suit the particular installation.

It will be noted that clips of different sizes may be effectively and conveniently used with the separable clip type of unit shown in Fig. 7, clip G for example, being larger than clip F. Moreover, if desired the dual clip arrangement shown in Figs. 1 and 2 could embody clips of different sizes even though the two clips are made from a single piece of strap metal.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a multiple clip for supporting conduits or the like, a bracket having means to accommodate a fastening for securing the bracket to a support, a pair of conduit-embracing loops of resilient metal having end portions independently movable to open and close the mouths of the loops for reception and removal of conduits, means securing end portions of said loops to said bracket so that the other end portions of the loops are independently movable for opening and closing said loops, and means embodied in said bracket and end portions of said loops for accommodating fastenings for independently clamping said loops around the conduits or the like, the loops of said pair occupying opposite side portions of said bracket with their mouths directed toward each other.

2. In a multiple clip for supporting conduits or the like, a bracket having means to accommodate a fastening for securing the bracket to a support, a pair of conduit-embracing loops of resilient metal having end portions independently movable to open and close the mouths of the loops for reception and removal of conduits, means securing end portions of said loops to said bracket so that the other end portions of the loops are independently movable for opening and closing said loops, and means embodied in said bracket and end portions of said loops for accommodating fastenings for independently clamping said loops around the conduits or the like, including registering openings in said bracket and end portions of the loops respectively, and nuts positionable between the bracket and its support carried by said bracket with their bolt receiving openings aligned with the openings in said bracket, the loops of said pair occupying opposite side portions of said bracket with their mouths directed toward each other.

3. In a multiple clip for supporting conduits or the like, a bracket having means to accommodate a fastening for securing the bracket to a support, a pair of conduit-embracing loops of resilient metal having end portions independently movable to open and close the mouths of the loops for reception and removal of conduits, means securing end portions of said loops to said bracket so that the other end portions of the loops are independently movable for opening and closing said loops, and means embodied in said bracket and end portions of said loops for accommodating fastenings for independently clamping said loops around the conduits or the like, the loops of said pair occupying opposite side portions of said bracket with their mouths directed toward each other, said bracket having a portion thereof arranged to lie in outwardly spaced relation to the support to which the bracket is secured and being provided with separate openings in said portion, said ends of said loops having openings therein adapted to register with the openings in said portion of said bracket whereby separate fastening means may be applied for independently clamping said loops around the conduits, the space between the outwardly spaced portion of the bracket and said support accommodating the said fastening means.

4. In a multiple clip for supporting conduits or the like, a bracket having means to accommodate a fastening for securing the bracket to a support, a pair of conduit-embracing loops of resilient metal having end portions independently movable to open and close the mouths of the loops for reception and removal of conduits, means securing end portions of said loops to said bracket so that the other end portions of the loops are independently movable for opening and closing said loops, means embodied in said bracket and end portions of said loops for accommodating fastenings for independently clamping said loops around the conduits or the like, the loops of said pair occupying opposite side portions of said bracket with their mouths directed toward each other, said bracket having a portion thereof arranged to lie in outwardly spaced relation to the support to which the bracket is secured and being provided with separate openings in said portion, said ends of said loops having openings therein adapted to register with the openings in said portion of said bracket, a pair of bolt receiving nuts having their threaded openings aligned with the openings in said ends and bracket, said nuts additionally serving as the means for permanently securing one end of each of said loops to said bracket.

5. In a bracket for supporting a plurality of conduit clips on a support, a body portion having openings therein affording the attachment thereto of a plurality of conduit clips, ears extending outwardly from opposite sides of the body portion and having openings therein for reception of fastenings for securing the bracket to a support, said ears being correspondingly offset so as to space the body portion outward from the support to which the ears are secured to afford a space between the bracket and the support for accommodating fastening means inserted through the openings in the body portion for securing a plurality of clips thereto, said body and ears being parts of a form-retaining piece of sheet material.

6. In a multiple clip for supporting conduits or the like, a bracket having means to accommodate a fastening for securing the bracket to a support, a pair of conduit-embracing loops of resilient metal having end portions independently movable to open and close the mouths of the loops for reception and removal of conduits, means securing certain end portions of said loops to said bracket so that the other end portions of the loops are independently movable for opening and closing said loops, means embodied in said bracket and end portions of said loops for accommodating fastenings for independently clamping said loops around the conduits or the like, said bracket having a portion thereof arranged to lie in outwardly spaced relation to the support to which the bracket is secured and being provided with separate openings in said portion, said ends of said loops having openings therein adapted to register with the openings in said bracket, a pair of bolt-receiving nuts having their threaded openings aligned with the openings in said ends and bracket, said nuts additionally serving as the means for permanently securing one end of each of said loops to said bracket with capacity for pivotal movement about the axis of said openings.

ERVIN S. GODDARD.

REFERENCES CITED

The following references are of record in the file of this patent:

UNITED STATES PATENTS

| Number | Name | Date |
|---|---|---|
| 566,544 | Smith | Aug. 25, 1896 |
| 1,531,411 | Perry | Mar. 31, 1925 |
| 2,346,200 | Tinnerman | Apr. 11, 1944 |
| 2,352,823 | Ellinwood | July 4, 1944 |

FOREIGN PATENTS

| Number | Country | Date |
|---|---|---|
| 692,760 | Germany | Nov. 10, 1930 |